April 9, 1968

HANS-NORBERT TOUSSAINT ET AL 3,377,528

FIELD-EFFECT PRESSURE TRANSDUCER

Filed Feb. 26, 1965

3,377,528
FIELD-EFFECT PRESSURE TRANSDUCER
Hans-Norbert Toussaint, Munich, and Friedrich Krieger, Gilching, Germany, assignors to Siemens Aktiengesellschaft, a corporation of Germany
Filed Feb. 26, 1965, Ser. No. 435,478
Claims priority, application Germany, Feb. 28, 1964, S 89,744
9 Claims. (Cl. 317—235)

Our invention relates to field-effect transistors.

In transistors of this type a semiconductor region is subjected to the effect of a transverse electrical field which controls the flow of current through the transistor. Field-effect transistors are described, for example, in Electronic Industries, March 1963, pages 99 to 101, and in Electronics, November 1963, No. 48, pages 44 to 47.

It is an object of our invention to considerably broaden the fields of use for field-effect transistors. Another, more specific object, is to make field-effect transistors applicable for pressure sensors, force gauges and other transducers.

According to the invention, we provide a field-effect transistor with a control mechanism comprising an insulated hard point which contacts the semiconductor body of the transistor in the region of its space charge zone and is subjected to variable pressure.

It is known as such to control electronic semiconductor devices by subjecting them to pressure with the aid of a hard point. Devices of this type are described, for example, in Bell Laboratory Record, December 1962, pages 418 to 419. The known devices, however, are area transistors operating with a fundamentally different control mechanism from the field effect transistors. The functioning of a pressure-controlled area transistor is believed to be due to the fact that the pressure produces an elastic deformation which changes the crystalline structure in the region of a p-n junction and thereby also its resistance value.

We have discovered that when a field effect transistor is subjected to pressure by means of an insulated hard point, and this pressure is active in the vicinity of a space charge region, there occurs an effect which influences the space charge zone with the same results as obtained with the aid of the conventional control method requiring a voltage to be applied to the control electrode to cause a variation of the electrical field.

The invention will be further described with reference to embodiments of field effect transistors according to the invention illustrated by way of example in the accompanying drawings, in which.

Figures 1, 2, 3:
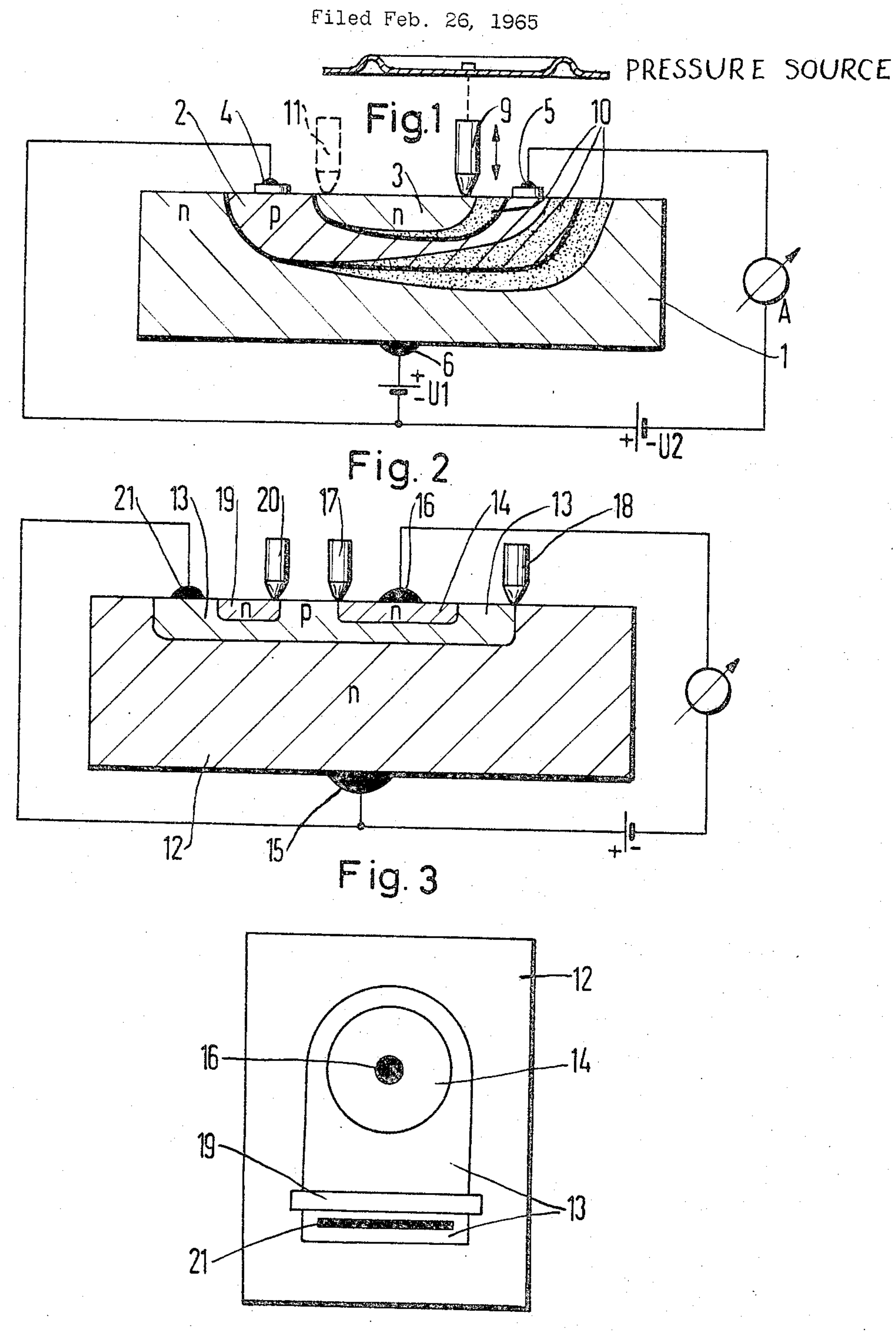
FIG. 1 shows schematically and on greatly enlarged scale a sectional view of a first embodiment of the field-effect transistor of the present invention.
FIG. 2 shows in a similar manner a second embodiment of the field-effect transistor of the present invention.
FIG. 3 is a top view of the field-effect transistor of FIG. 2.

The field effect transistor of FIG. 1 comprises a crystalline semiconductor disc 1 of silicon or germanium with an n-type region 1, a p-type region 2, and another n-type region 3. Space-charge zones 10 represented by dotted areas are formed in and around the p-type region. The space charge zones, depending upon their thickness, leave a wider or narrower current path available in the p-type region 2 through which a transport of the charge carriers takes place. By field control in the known manner, the size of this current path is varied, thus producing the controlling effect.

Electrodes 4 and 5 are bonded by barrier-free junctions to the semiconductor surface at the respective ends of the p-type region 2 for connection with an external circuit. The electrodes 4 and 5 thus constitute the output terminals of the transistor. The illustrated transistor further comprises a control electrode 6 to which a bias voltage is applied from a voltage source shown as a battery U1. Normally, the bias voltage produces a given space charge and a correspondingly adjusted cross section of the current path. The output circuit connected between the terminal electrodes 4 and 5, comprises a voltage source, shown as a battery U2, and a load component here constituted by a measuring instrument A. Depending upon the resistance value of the field-effect transistor, the voltage of battery U2 drives through the transistor a current whose magnitude is indicated by the instrument A. With such field-effect transistors, the control has been heretofore performed by varying the bias voltage applied to the control electrode 6, resulting in a corresponding variation of the current flowing between the terminal electrodes 4 and 5.

The transistor according to FIG. 1 is further provided with an insulated hard point 9 consisting for example of sapphire and engaging the semiconductor crystal in the region of a space charge zone. Depending upon the pressure exerted by the point 9 upon the field effect transistor, the current path becomes more or less constricted. Consequently, any variations in pressure applied to the field-effect transistor cause a variation in resistance of the transistor between the terminal electrodes 4 and 5, which results in a corresponding variation of the output current indicated by the measuring instrument A.

In the embodiment of FIG. 1 the space charge distribution, dependent upon the magnitude and chosen polarity of the voltage sources U1 and U2, extends essentially over the right-hand portion of the p-type region 2. If the point 9 is placed into pressure engagement with the transistor in the region of this relatively large volume of space charge, a correspondingly large control effect by means of pressure variation is obtained. The point 9 in FIG. 1 is shown situated at such a particularly effective locality. It has been found that when the pressure applied through the point increases, the current passing through the field-effect transistor increases accordingly. The point 9 may also be applied to a different locality of the field-effect transistor, for example, as represented by the broken-line point 11. The effect of pressure variations at point 11 is smaller than that of point 9, because an only relatively slight space-charge intensity obtains in the vicinity of point 11. It has been found that when the pressure applied to the point 11 is increased, the current passing through the field-effect transistor is reduced.

We have further found that it is only necessary to connect the two terminal electrodes 4 and 5 into an electrical circuit, whereas the control electrode 6 need not be so connected. This is significant because it leads to a two-pole device requiring a considerably simpler circuitry than a three-pole as represented by a transistor with a control electrode 6. A transistor without a control electrode 6, or with the control electrode 6 not connected in the transistor circuitry, also shows the above-described effect of point 9 or point 11 upon the resistance value of the field-effect transistor.

The distribution of the space charge schematically shown in FIG. 1 also applies under conditions where the battery U1 is absent and the control electrode 6 is not connected into the transistor circuit. If under these conditions the battery U2 is given a reversed polarity, the region of the more intensive space charges shifts away from the electrode 5 toward the electrode 6. In other words, the space-charge distribution is then mirror-symmetrical to the one represented in FIG. 1. Accordingly, the pressure points 9 and 11 reverse their respective functions described above. That is, increased pressure on point 9 then reduces the resistance of the transistor, whereas increased pressure upon the point 11 then increases the resistance. It will be recognized that such a transistor device is polarity-dependent, which is undesirable for many purposes.

We have found, however, that there is at least one locality in the region of the space discharge at which a pressure point engaging the semiconductor crystal of the transistor has the same effect regardless of the polarities of the respective terminal electrodes 4 and 5. This particular locality in a transistor according to FIG. 1 is substantially midway between the points 9 and 10. A device of this kind is not dependent upon polarity, but operates as a controllable resistor without any directional sensitivity.

The foregoing applies also to a field-effect transistor designed on the MOS principle as known, for example, from Electronics, November 1963, No. 48, page 44. In this case, the point used for controlling the transistor is seated between the two p-type regions where it acts upon the space charge occurring between these two regions.

It is particularly advantageous to integrate a field-effect transistor controlled in the above-described manner, with an area transistor which is controlled by one or more additional pressure points. The embodiment shown in FIG. 2 is of such type.

According to FIG. 2, a semiconductor block 12 of n-type material contains a p-type region 13 into which an n-type region 14 is diffused. The regions 13 and 14 may be produced, for example, in the conventional manner by diffusing dopant through oxide masks having the required geometric shape produced by a photochemical method. The three regions 12, 13 and 14 conjointly constitute an npn area transistor. The p-region 13 forms the base, the n-region 12 the collector, and the n-region 14 the emitter of the area transistor. The collector and emitter are joined via respective collector and emitter electrodes 15 and 16. The control of the area transistor is effected, on the one hand, by points 17 and 18 which control in known manner the conductivity of the area transistor. On the other hand, the control of the area transistor is also effected by a field-effect transistor constituted by the p-zone 13 and the n-zone 19. This field-effect transistor corresponds in design and functioning to the transistor according to FIG. 1. The field-effect transistor is acted upon by a point 20 and thereby controls the current flowing through the electrode 21 into the p-zone 13, the latter current also constituting the base current for the area transistor.

Consequently, a current passing through the output or terminal electrodes 21 and 16 of the integrated transistor device is jointly controlled by the three points 17, 18 and 20. Each of the three points controls the device without reaction effect, so that any desired combination of control functions may be achieved, such as required for modulation purposes. It is preferable to simultaneously produce the transistor portion 12, 13, 14 and the field-effect portion 12, 13, 19 by the same diffusion method.

FIG. 3, being a top view of the integrated device according to FIG. 2, shows the n-type block 12 and its p-type region 13, which is separated into two portions by the n-type region 19 on the surface of the block. The lower region 13 carries the terminal electrode 21. Located in the upper portion of the region 13 is the n-type region 14, the other terminal electrode 16 being located in the center of the latter region. The points 17, 18, 20 shown in FIG. 2 are omitted in FIG. 3.

A field-effect transistor according to the invention is applicable as a pressure sensor. The transistor may also form part of a microphone by connecting the controlling pressure point with the diaphragm of the microphone. The resulting microphone device is particularly sensitive.

A microphone is essentially a transducer which converts sound waves into alternating voltages. The transducer thus translates pressure variations into corresponding variations of an electric current. For this purpose the point is preferably subjected to a given pre-pressure bias in order to adjust a working point of the field effect transistor at which it conducts a given amount of current in its idle condition. When the above-mentioned pressure variations become superimposed upon the bias pressure, the resulting current variations are superimposed upon the normally flowing current. That is, the circuit connected to such a transducer or microphone is traversed by a direct current under idle conditions, and an alternating current component is superimposed upon the direct current in dependence upon the pressure variations applied to the controlling pressure point. Depending upon the desired operating conditions, the working point may be so chosen that it is located, for example, in the middle of the characteristic of the field effect transistor, thus placing the working point into a largely linear portion of the characteristic so that the current variations are substantially in linear proportion to the pressure variations. If desired, however, a particularly steep portion of the characteristic may be chosen for the working point in cases where slight pressure increases are to be translated into largest feasible current increases. In each case, care must be taken that the bias pressure and the superimposed pressure to be responded to do not exceed a value at which the transistor becomes plastically deformed.

To those skilled in the art, it will be obvious upon a study of this disclosure, that our invention permits of various modifications and may be given embodiments other than particularly illustrated and described herein without departing from the essential features of the invention and within the scope of the claims annexed hereto.

We claim:

1. Field-effect transistor, comprising a semiconductor body having three regions of alternately opposed conductivity type forming two pn junctions therebetween and having two terminal electrodes spaced from each other on the intermediate one of said regions and defining between each other a current path having a resistance dependent upon space charges, and means for subjecting said body to variable pressure, said means comprising an electrically insulated hard pressure point in pressure engagement with said body in a space charge region.

2. Field-effect transistor, comprising a semiconductor body having three regions of alternately opposed conductivity type forming two pn junctions therebetween and having two terminal electrodes spaced from each other on the intermediate one of said regions and defining between each other a current path having a resistance dependent upon space charges, unidirectional voltage means connected between said two terminal electrodes whereby the space charges are more voluminous near one of said terminal electrodes than near the other, when said voltage means are active, and means for subjecting said body to variable pressure, said means comprising an electrically insulated hard pressure point in pressure engagement with said body near said one terminal electrode.

3. Field-effect transistor, comprising a semiconductor body having three regions of alternately opposed conductivity type forming two pn junctions therebetween, two mutually adjacent ones of said regions emerging at the same surface side of said body, two terminal electrodes joined with said body at said side in mutually spaced relation on the intermediate one of said regions and defining between each other a current path having a resistance dependent upon space charges, and means for subjecting said body to variable pressure, said means comprising an electrically insulated point structure in pressure engagement with said body on said side at a locality between said two terminal electrodes.

4. Field-effect transistor according to claim 3, comprising a third electrode on the third region of said body, a load circuit including a voltage source and being connected to said two terminal electrodes, said third electrode being isolated from said circuit.

5. In a field-effect transistor according to claim 1, said pressure point being at a neutral locality of said body relative to the polarity of said terminal electrodes, whereby the resistance variation caused by said pressure point is independent of the electrode polarities.

6. With a field-effect transistor according to claim 1, in combination, an area transistor having a semiconductor body integral with said body of said field-effect transistor and having a controllable p-n junction serially related to said intermediate region of said field-effect resistor, one of said two terminal electrodes being disposed on said area transistor so that said current path extends serially through both said transistors, and further pressure-point means on said area transistor for controlling the resistance of said p-n junction.

7. Field-effect transistor according to claim 1, comprising bias means connected with said pressure point for applying thereto a pressure bias to provide a given working point of the transistor characteristic.

8. Field-effect transistor according to claim 1, comprising pressure-responsive structures connected with said pressure point for causing it to vary the pressure imposed upon said transistor body whereby said transistor operates as a pressure-voltage transducer.

9. Field-effect transistor according to claim 1, comprising a microphone diaphragm connected with said pressure point for causing it to vary the pressure imposed upon said transistor body.

References Cited

UNITED STATES PATENTS

| | | | |
|---|---|---|---|
| 2,632,062 | 3/1953 | Montgomery | 179—121 |
| 2,869,055 | 1/1959 | Noyce | 317—235 |
| 2,929,885 | 3/1960 | Mueller | 179—121 |
| 3,270,554 | 9/1966 | Pfann | 73—88.5 |
| 3,319,082 | 5/1967 | Touchy | 307—88.5 |

JOHN W. HUCKERT, *Primary Examiner.*

R. F. SANDLER, *Examiner.*